US012724193B2

(12) United States Patent
Choi et al.

(10) Patent No.: US 12,724,193 B2
(45) Date of Patent: Sep. 1, 2026

(54) BACKLIGHT UNIT AND DISPLAY APPARATUS HAVING THE SAME

(71) Applicant: Seoul Semiconductor Co., Ltd., Ansan-si (KR)

(72) Inventors: Seung Ri Choi, Ansan-si (KR); Eun Ju Kim, Ansan-si (KR); Hee Soo Lim, Ansan-si (KR)

(73) Assignee: Seoul Semiconductor Co., Ltd., Ansan-si (KR)

( * ) Notice: Subject to any disclaimer, the term of this patent is extended or adjusted under 35 U.S.C. 154(b) by 0 days.

(21) Appl. No.: 19/175,052

(22) Filed: Apr. 10, 2025

(65) Prior Publication Data

US 2025/0237805 A1 Jul. 24, 2025

Related U.S. Application Data

(63) Continuation of application No. 18/649,737, filed on Apr. 29, 2024, now Pat. No. 12,298,552, which is a (Continued)

(51) Int. Cl.
*F21V 8/00* (2006.01)

(52) U.S. Cl.
CPC ......... *G02B 6/0068* (2013.01); *G02B 6/0016* (2013.01); *G02B 6/003* (2013.01); *G02B 6/0031* (2013.01)

(58) Field of Classification Search
CPC .. G02B 6/0031; G02B 6/0073; G02B 6/0043; G02B 6/0051; G02B 6/0088; G02B 6/00;
(Continued)

(56) References Cited

U.S. PATENT DOCUMENTS

| | | | |
|---|---|---|---|
| 9,112,093 | B2 | 8/2015 | Lim |
| 10,054,733 | B2 | 8/2018 | Lee |

(Continued)

FOREIGN PATENT DOCUMENTS

| | | |
|---|---|---|
| CN | 106206907 | 12/2016 |
| CN | 108490683 | 9/2018 |

(Continued)

OTHER PUBLICATIONS

U.S. Office Action issued in U.S. Appl. No. 18/503,570 on Mar. 21, 2024.

(Continued)

*Primary Examiner* — William J Carter

(74) *Attorney, Agent, or Firm* — Oblon, McClelland, Maier & Neustadt, L.L.P.

(57) ABSTRACT

A display apparatus including a display panel, a light source configured to emit light, and a light guide disposed on the light source and covering a side of the light source, the light source including a substrate, a light emitter including a light emitting stacked layer and disposed on the substrate, a light blocking layer disposed on a side surface of the light emitting stacked layer, and a reflector disposed between the substrate and the light guide, in which the light emitter has a first length direction and a second length direction, wherein orientation angles of the light emitter in the first and second length directions are different from each other, the substrate includes a first pad electrode and second pad electrode electrically connected to the light emitter, and the first and second pad electrodes are spaced apart from each other by at least 50 μm.

20 Claims, 21 Drawing Sheets

Related U.S. Application Data continuation of application No. 18/087,812, filed on Dec. 23, 2022, now Pat. No. 12,019,266, which is a continuation of application No. 17/194,286, filed on Mar. 7, 2021, now Pat. No. 11,536,893, which is a continuation of application No. PCT/KR2019/011357, filed on Sep. 3, 2019.

(60) Provisional application No. 62/731,229, filed on Sep. 14, 2018.

(58) Field of Classification Search
CPC .... G02B 6/4214; G02B 6/068; G02B 6/0016; G02B 6/003; F21V 8/00
See application file for complete search history.

(56) References Cited

U.S. PATENT DOCUMENTS

| | | | | |
|---|---|---|---|---|
| 10,401,557 | B2 | 9/2019 | Kim et al. | |
| 2007/0085105 | A1 | 4/2007 | Beeson et al. | |
| 2010/0038665 | A1* | 2/2010 | Sugiura | H10H 20/853 257/E33.056 |
| 2012/0147277 | A1* | 6/2012 | Yamamoto | G02B 6/0021 348/790 |
| 2016/0116663 | A1* | 4/2016 | Hong | G02B 6/0053 362/330 |
| 2016/0349445 | A1 | 12/2016 | Kim et al. | |
| 2018/0136520 | A1 | 5/2018 | Kim | |
| 2018/0356684 | A1 | 12/2018 | Chang et al. | |
| 2019/0391449 | A1* | 12/2019 | Hao | G02B 6/0031 |

FOREIGN PATENT DOCUMENTS

| | | |
|---|---|---|
| JP | 2014-033182 | 2/2014 |
| KR | 10-2013-0031437 | 3/2013 |
| KR | 10-2016-0059006 | 5/2016 |
| KR | 10-2016-0071836 | 6/2016 |
| KR | 10-2016-0116778 | 10/2016 |
| KR | 10-2018-0086840 | 8/2018 |

OTHER PUBLICATIONS

Chinese Office Action issued in Chinese Patent Application No. 201910860107.6 on Oct. 20, 2023 (with English Explanation).
European Office Action issued in European Patent Application No. 19860830.9 on Ocober 23, 2023.
Crescience, "Samsung LM301B LED Chip," retrieved from <http://cre.science/samsung-lm301b-led-chip/?v=3a52f3c22ed6> on Oct. 23, 2023.
International Search Report issued in International Patent Application No. PCT/KR2019/011357 on Dec. 11, 2019.
European Search Report issued in European Patent Application No. 19860830.9 on May 3, 2022.
U.S. Office Action issued in U.S. Appl. No. 17/194,286 on Sep. 24, 2021.
U.S. Office Action issued in U.S. Appl. No. 17/194,286 on Apr. 1, 2022.
U.S. Notice of Allowance issued in U.S. Appl. No. 17/194,286 on Aug. 24, 2022.
United States Notice of Allowance issued Mar. 27, 2024 in U.S. Appl. No. 18/087,812.
United States Notice of Allowance issued May 16, 2024 in U.S. Appl. No. 18/087,812.
U.S. Final Rejection issued in U.S. Appl. No. 18/503,570 on Oct. 2, 2024.

* cited by examiner

BACKLIGHT UNIT AND DISPLAY APPARATUS HAVING THE SAME

CROSS REFERENCE TO RELATED APPLICATIONS

This application is a continuation of U.S. patent application Ser. No. 18/649,737 filed Apr. 29, 2024, which is a continuation of U.S. patent application Ser. No. 18/087,812 filed Dec. 23, 2022 (now U.S. Pat. No. 12,019,266), which is a continuation of U.S. patent application Ser. No. 17/194,286 filed Mar. 7, 2021 (now U.S. Pat. No. 11,536,893), which is a Bypass continuation of International Patent Application No. PCT/KR2019/011357 filed Sep. 3, 2019, and which claims priority from and the benefit of U.S. Provisional Application No. 62/731,229 filed Sep. 14, 2018, each of which is incorporated by reference for all purposes as if fully set forth herein.

BACKGROUND

Field

Exemplary embodiments of the invention relate to a backlight unit and a display apparatus having the same.

Discussion of the Background

A liquid crystal display apparatus is a thin type display apparatus having high resolution, which typically receives light to display an image. The liquid crystal display apparatus includes a liquid crystal panel in which liquid crystals are aligned, and a backlight unit supplying light to the liquid crystal panel. In particular, the backlight unit includes a light source, such as a line light source or a point light source, and an optical sheet through which light emitted from the light source passes. The optical sheet converts the line light source or the point light source into a complete surface light source to increase the brightness of light. The display apparatus is being developed to become thinner, however, forming a thin display apparatus is greatly limited by the structure of the backlight unit.

The above information disclosed in this Background section is only for understanding of the background of the inventive concepts, and, therefore, it may contain information that does not constitute prior art.

SUMMARY

Backlight units constructed according to exemplary embodiments of the invention have a slim size and are capable of providing light with high uniformity.

A display apparatus according to an exemplary embodiment is has a slim form factor by employing the backlight unit according to exemplary embodiments.

Additional features of the inventive concepts will be set forth in the description which follows, and in part will be apparent from the description, or may be learned by practice of the inventive concepts.

A display apparatus according to an exemplary embodiment includes a display panel, a light source unit configured to provide light to the display panel, and a light guide member disposed between the display panel and the light source unit and covering the light source unit such that the light source unit is buried in the light guide member, the light guide member having a surface roughness on an upper surface thereof to diffuse light and including a substrate, and a light emitting device disposed on the substrate and including a blocking pattern to have an intensity of light emitted in an upward direction to be equal to or less than about 80% of a maximum light intensity of the light emitting device.

The intensity of light emitted in the upward direction may be equal to or less than about 50% of the maximum light intensity of the light emitting device.

A distance from an upper surface of the substrate to an upper surface of the light guide member may be equal to or less than about 400 micrometers.

The light emitting device may include a device substrate having a first surface and a second surface, a light emitting stacked structure disposed on the second surface, and a first blocking pattern of the blocking pattern disposed on the first surface.

The blocking pattern may further include a second blocking pattern covering an upper surface of the light emitting stacked structure.

Each of the first and second blocking patterns may include a distributed Bragg reflector (DBR) dielectric mirror.

The first blocking pattern may include a dielectric mirror to block blue light and yellow light.

The second blocking pattern may include a dielectric mirror to block blue light.

The light emitting device may have a first light profile in a first length direction and a second light profile different from the first light profile in a second length direction crossing the first length direction.

The light emitting device may further include a first contact electrode and a second contact electrode, the substrate may include a first pad electrode electrically connected to the first contact electrode with a first solder interposed therebetween, and a second pad electrode electrically connected to the second contact electrode with a second solder interposed therebetween, and the first and second pad electrodes may be spaced apart from each other by at least about 50 micrometers.

The light emitting device may be provided in plural, and the light emitting devices may be arranged on the substrate in a matrix form.

The light emitting devices may be spaced apart from each other at a first pitch in a first direction and be spaced apart from each other at a second pitch different from the first pitch in a second direction substantially perpendicular to the first direction.

A distance between an edge of the substrate and the light emitting device closest to the edge may be equal to or greater than about 1 mm.

The display apparatus may further include an optical sheet disposed between the light source unit and the display panel.

The light guide member may include a silicone resin.

The light guide member may include light scattering particles distributed in the silicone resin.

The light emitting device may be configured to emit blue light.

The display apparatus may include a light conversion film disposed between the light source unit and the display panel to convert a wavelength band of light emitted from the light emitting device.

The light conversion film may include at least one of a quantum dot and a fluorescent substance.

A backlight unit according to another exemplary embodiment includes a light source unit configured to emit light, and a light guide member disposed on the light source unit and covering the light source unit such that the light source unit is buried in the light guide member, the light source unit having a surface roughness on an upper surface thereof to diffuse light and including a substrate, and a light emitting device disposed on the substrate and including a blocking pattern to have an intensity of light emitted in an upward direction to be equal to or less than about 80% of a maximum light intensity of the light emitting device.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

DETAILED DESCRIPTION

Figure 1:
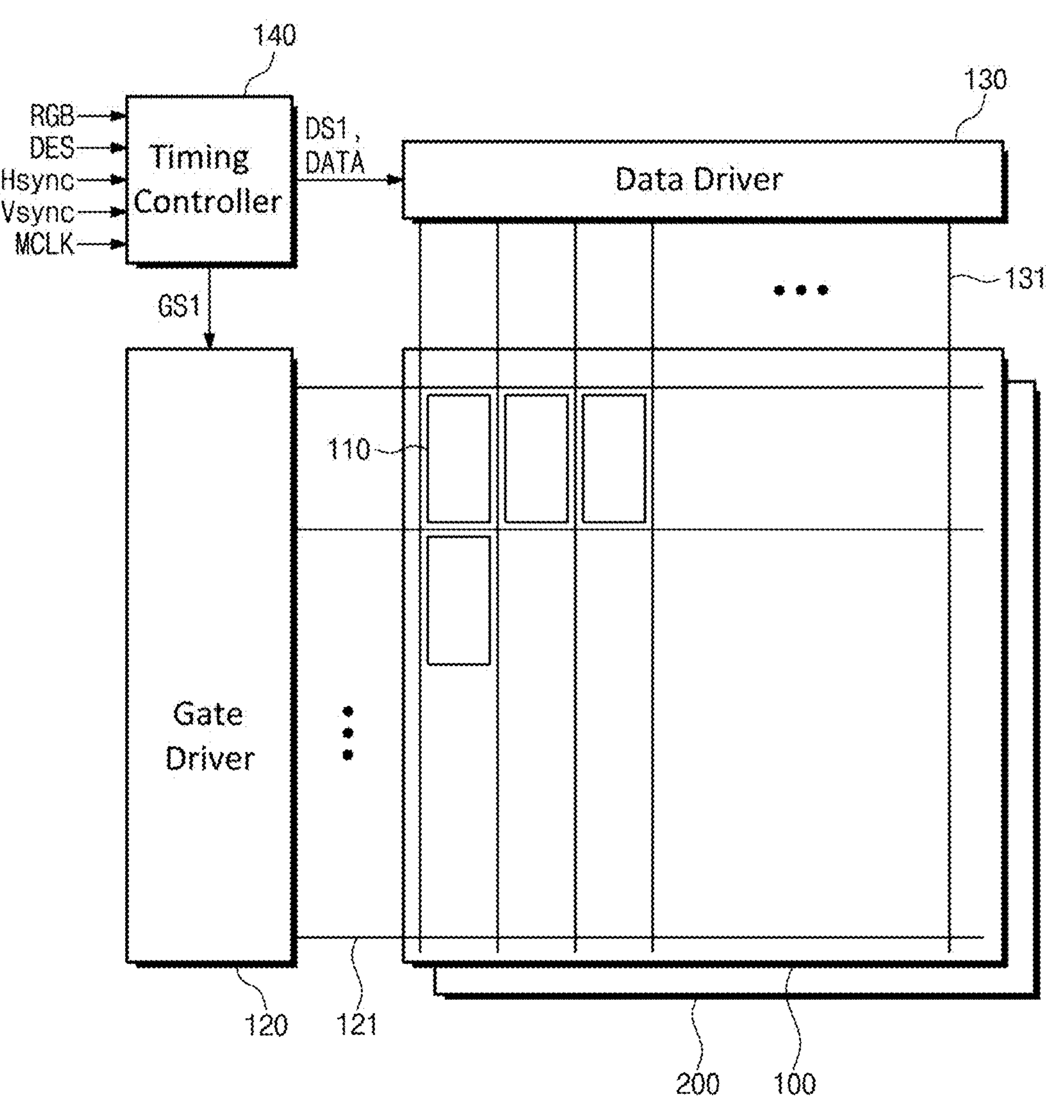
FIG. 1 is a block diagram of a display apparatus according to an exemplary embodiment.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, exemplary embodiments of the inventive concepts will be explained in detail with reference to the accompanying drawings.

FIG. 1 is a block diagram of a display apparatus according to an exemplary embodiment.

Referring to FIG. 1, the display apparatus according to an exemplary embodiment includes a display panel 100, a backlight unit 200 providing light to the display panel 100, and a circuit unit driving the display panel 100 and the backlight unit 200.

The display panel 100 may include a plurality of pixels 110 to display an image, and may be a light receiving type display panel that uses light emitted from the backlight unit 200. The light receiving type display panel may include a liquid crystal panel, an electrophoretic panel, and an electrowetting panel, without being limited thereto. In the illustrated exemplary embodiment, the display panel 100 may be a liquid crystal panel that includes two substrates and a liquid crystal layer interposed between the two substrates.

The circuit unit includes a timing controller 140, a gate driver 120, and a data driver 130.

The display panel 100 includes a plurality of gate lines 121 extending in one direction and a plurality of data lines 131 extending in another direction crossing the one direction. The display panel 100 may include the pixels 110. The pixels 110 may be arranged in a matrix form, and each pixel 110 may be connected to a corresponding gate line 121 and a corresponding data line 131.

The timing controller 140 receives image data RGB and control signals from an external graphics controller. The control signals include a vertical synchronization signal Vsync as a frame distinction signal, a horizontal synchronization signal Hsync as a row distinction signal, a data enable signal DES maintained at a high level during a period in which data are output to indicate a data input period, and a main clock signal MCLK.

The timing controller 140 converts the image data RGB into image data adaptive to the data driver 130 and outputs the converted image data DATA to the data driver 130. The timing controller 140 generates a gate control signal GS1 and a data control signal DS1 based on the control signals. The timing controller 140 outputs the gate control signal GS1 to the gate driver 120 and outputs the data control signal DS1 to the data driver 130. The gate control signal GS1 is used to drive the gate driver 120, and the data control signal DS1 is used to drive the data driver 130.

The gate driver 120 generates gate signals based on the gate control signal GS1, and outputs the gate signals to the gate lines 121. The gate control signal GS1 may include a scan start signal indicating scan start, at least one clock signal controlling an output timing of a gate-on voltage, and an output enable signal defining a duration of the gate-on voltage.

The data driver 130 generates a grayscale voltage based on the image data DATA in response to the data control signal DS1, and outputs the grayscale voltage to the data lines 131 as a data voltage. The data voltage may include a positive (+) data voltage having a positive polarity with respect to a common voltage, and a negative (−) data voltage having a negative polarity with respect to the common voltage. The data control signal DS1 may include a horizontal start signal that indicates a transmission of the image data DATA to the data driver 130, a load signal that indicates an application of the data voltage to the data lines 131, and an inverting signal that inverts the polarity of the data voltage with respect to the common voltage.

Each of the timing controller 140, the gate driver 120, and the data driver 130 may be directly mounted on the display panel 100 in the form of an integrated circuit, may be attached to the display panel 100 using a tape carrier package (TCP) after being mounted on a flexible printed circuit board 211, or may be mounted on a separate printed circuit board 211. As another example, at least one of the gate driver 120 and the data driver 130 may be integrated in the display panel 100 together with the gate lines 121, the data lines 131, and transistors. In addition, the timing controller 140, the gate driver 120, and the data driver 130 may be integrated in a single chip.

The backlight unit 200 provides light to the display panel 100. The backlight unit 200 is connected to the circuit unit, and the brightness of light may be controlled depending on the image displayed in the pixels 110. For example, the backlight unit 200 may implement a local dimming in which a display area of the display panel 100 is divided into a plurality of areas, and the brightness of a light source is controlled depending on the brightness of the image.

Figure 2:
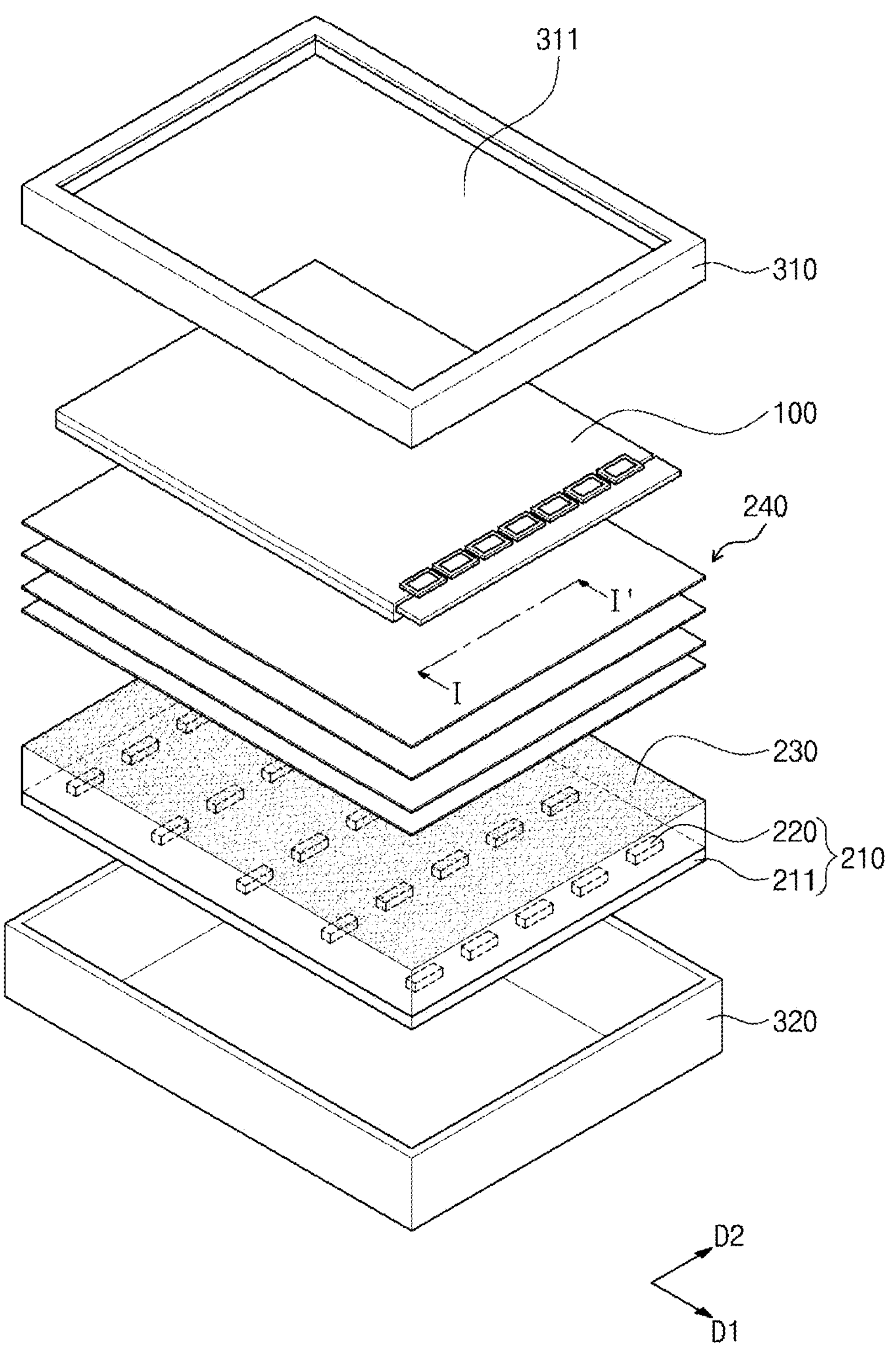
FIG. 2 is an exploded perspective view of the display apparatus of FIG. 1 according to an exemplary embodiment.

FIG. 2 is an exploded perspective view of the display apparatus of FIG. 1 according to an exemplary embodiment. As used herein, two directions crossing each other and defining a plane substantially parallel to the display panel 100 are illustrated as a first direction D1 and a second direction D2, and a direction substantially vertical to the plane defined by the first and second directions D1 and D2 is illustrated as a third direction D3.

Referring to FIG. 2, the display apparatus includes the display panel 100, the backlight unit 200, a lower cover 320, and an upper cover 310.

The display panel 100 displays an image. In the illustrated exemplary embodiment, the display panel 100 displays the image in an upward direction, and the backlight unit 200 is disposed below the display panel 100. However, the inventive concepts are not limited thereto, and the upward and downward directions may be changed relatively by rotation or movement of the display apparatus.

The display panel 100 may have substantially a rectangular plate shape with long sides and short sides. The display panel 100 may be a liquid crystal display panel, and the liquid crystal panel includes two substrates and liquid crystals formed between the two substrates.

The display panel 100 may drive the liquid crystals to display an image in a forward direction. To drive the liquid crystals, a thin film transistor may be formed in one substrate, and a color filter may be formed in the other substrate. However, positions of the thin film transistor and the color filter are not limited thereto.

Since the liquid crystals are non-emissive, a light source is required to display an image. A transmission light emitted from the light source includes vibration vectors that may not be required. As such, polarizing plates are attached on both surfaces of the display panel 100, such that transmission axes of the polarizing plates are intersected at about 90 degrees to adjust the vibration vectors of the transmission light. The polarizing plates polarize the transmission light exiting from the liquid crystals to light with a specific vibration vector. Accordingly, an intensity of the transmission light is controlled depending on the degree of rotation of polarizing axes while the transmission light passes through the display panel 100, and thus, the display panel 100 may express colors from black to white.

The backlight unit 200 is disposed under the display panel 100. The backlight unit 200 includes a light source unit 210 and a light guide member 230 disposed on the light source unit 210. An optical member 240 may be disposed between the light guide member 230 and the display panel 100.

The light source unit 210 provides light that is used by the display panel 100 to display an image. The light source unit 210 includes light emitting devices 220 emitting light and a substrate 211 on which the light emitting devices 220 are mounted.

The light emitting devices 220 may emit light having various wavelength bands. In an exemplary embodiment, the light emitting devices 220 may emit light in a visible light band, for example, blue light. In addition, the light emitting devices 220 may emit light having a specific color, such as yellow, cyan, and magenta, as well as blue, green, and red, or may emit white light instead of light having a specific color. However, the inventive concepts are not limited thereto, and the light emitting devices 220 may emit ultraviolet light in some exemplary embodiments.

The light guide member 230 covers the light source unit 210 such that the light source unit 210 is buried in the light guide member 230.

Each light emitting device 220 may function as a point light source, and thus, the light emitting device 220 may be mounted in a small area. In addition, the light emitting device 220 has high efficiency due to high brightness of light emitted therefrom. However, when the light emitting device 220 functions as the point light source, a light uniformity is required. In addition, when the light source function as a line light source in some exemplary embodiments, the light uniformity is required in a direction substantially perpendicular to a light emission direction of the line light source. As used herein, the expression "light is uniform" means that an image of the light source is not visible on the display panel 100. When the light emitting device 220 functions as the point light source and when light emitted from the light source is directly used in the display panel 100, a dark portion and a light portion may be generated depending on the intensity of light emitted, which may deteriorate image quality. As such, it is required to change a path of light emitted from the light source, as well as to increase light efficiency.

The light guide member 230 diffuses light emitted from the light emitting device 220 with a specific directionality to light of various directions. The light guide member 230 may have a thin plate shape or a film shape.

The light source unit 210 and the light guide member 230 will be described in more detail later with reference to accompanying drawings.

The optical member 240 is disposed between the light guide member 230 and the display panel 100. The optical member 240 controls light emitted from the light source unit 210 to increase light efficiency of the light source unit 210. The optical member 240 may be provided as a very thin sheet or a film. The optical member 240 may include a diffusion sheet, a prism sheet, and a protective sheet. Each of the diffusion sheet, the prism sheet, and the protective sheet may be provided in one or more sheets, and at least one of the diffusion sheet, the prism sheet, and the protective sheet may be omitted in some exemplary embodiments. In addition, the diffusion sheet, the prism sheet, and the protective sheet may be provided separately, but may also be provided as a multi-functional sheet in which the diffusion sheet and the prism sheet are formed integrally.

The diffusion sheet may diffuse light emitted from the light source unit 210. The prism sheet may collect the diffused light by the diffusion sheet in a direction substantially perpendicular to the plane of the display panel 100 disposed thereabove. The protective sheet may be disposed on the prism sheet and may protect the prism sheet from scratches.

Figure 4:
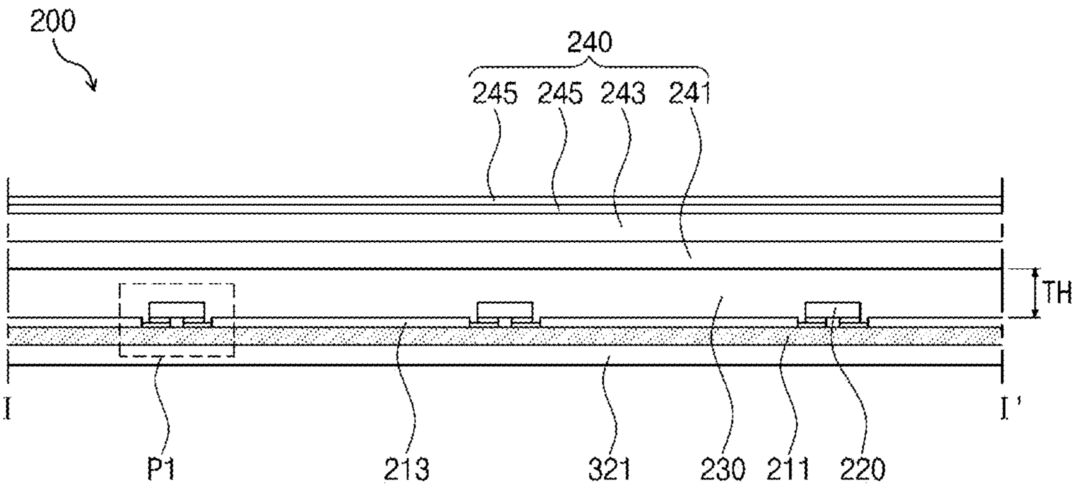
FIG. 4 is a cross-sectional view taken along line I-I' of FIG. 2 illustrating the light source unit, the light guide member, and an optical member according to an exemplary embodiment.

At least one of the diffusion sheet, the prism sheet, and the protective sheet of the optical member 240 may be provided in plural, and any one of the diffusion sheet, the prism sheet, and the protective sheet may be omitted as necessary. In the illustrated exemplary embodiment, the optical member 240 may include one multi-functional sheet 243 and two diffusion sheets 245 as shown in FIG. 4.

In the illustrated exemplary embodiment, the optical member 240 may further include a light conversion film 241, which is disposed between the light source unit 210 and the display panel 100, to convert the wavelength band of light emitted from the light emitting device 220. The backlight unit 200 may or may not include the light conversion film 241 depending on the wavelength band of light emitted from the light emitting device 220. The light conversion film 241 may be provided when it is necessary to change light emitted from a light emitting unit to white light or light of a specific wavelength band. For example, when the light emitting device 220 of the light emitting unit emits blue light, the light conversion film 241 may convert ultraviolet light or blue light into green light, yellow light, and/or red light. To this end, the light conversion film 241 may include a light conversion material to receive light emitted from the light source unit 210, and to convert the wavelength of light. The light conversion material may be a quantum dot or a fluorescent substance.

In the illustrated exemplary embodiment, the optical member 240 may include the light conversion film 241, the multi-functional sheet 243, in which the prism sheet and the protective sheet are coupled to each other, and two diffusion sheets 245. Each of the light conversion film 241 and the multi-functional sheet 243 may have a thickness equal to or less than about 400 micrometers (μm), and the diffusion sheet 245 may have a thickness equal to or less than about 50 micrometers (μm).

The upper cover 310 is disposed on the display panel 100. The upper cover 310 supports a front edge of the display panel 100. The upper cover 310 is provided with a display window 311 defined therethrough to expose the display area of the display panel 100.

The lower cover 320 provides a space to accommodate the backlight unit 200 and the display panel 100. In addition, the upper cover 310 is coupled to the lower cover 320 to stably fix the backlight unit 200 and the display panel 100 to the lower cover 320.

In an exemplary embodiment, the light source unit 210 and the light guide member 230 have a structure for efficiently dispersing light emitted from the light source. Hereinafter, the structure of the light source unit 210 and the light guide member 230 will be described in more detail.

Figure 3:
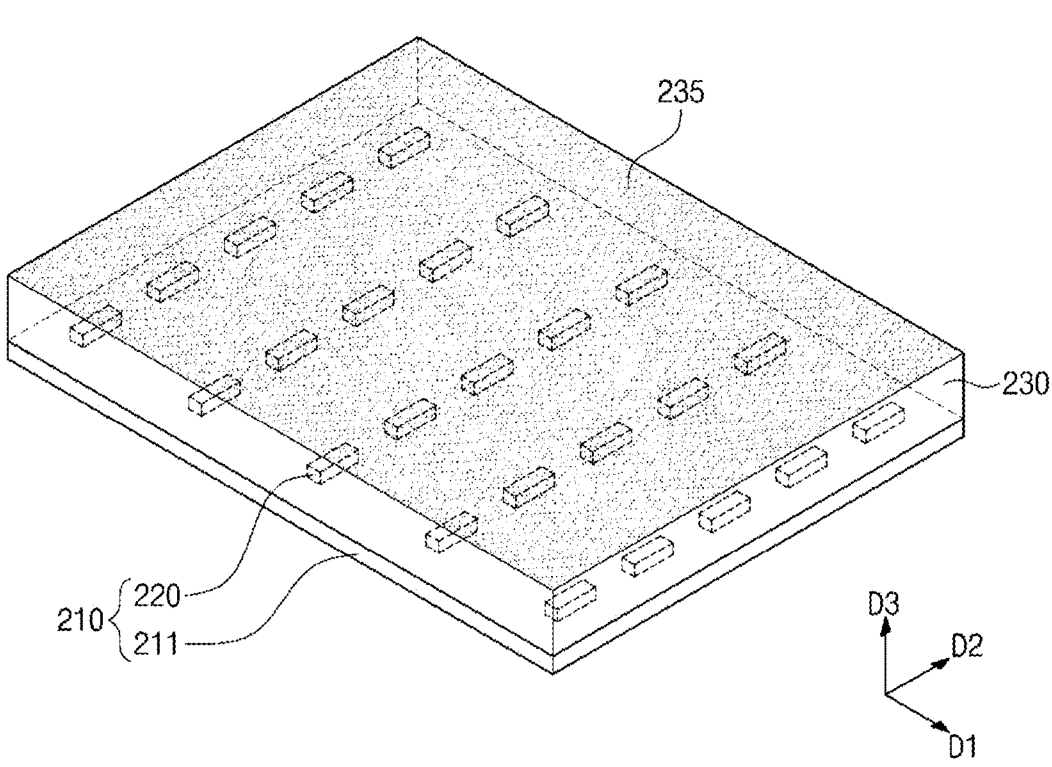
FIG. 3 is a perspective view of a light source unit and a light guide member of a backlight unit according to an exemplary embodiment.

FIG. 3 is a perspective view of the light source unit 210 and the light guide member 230 of the backlight unit according to an exemplary embodiment, and FIG. 4 is a cross-sectional view taken along line I-I' of FIG. 2 illustrating the light source unit 210, the light guide member 230, and the optical member 240 according to an exemplary embodiment.

Referring to FIGS. 3 and 4, the backlight unit 200 is accommodated in the lower cover 320. The light source unit 210, the light guide member 230, and the optical member 240 are sequentially provided on the lower cover 320.

The light source unit 210 includes the substrate 211 and the light emitting devices 220 mounted on the substrate 211, and the light guide member 230 is disposed on the light source unit 210.

The substrate 211 may be a printed circuit board, and the light emitting devices 220 may be electrically connected to the printed circuit board. In the drawings, the light emitting devices 220 are exemplarily illustrated as being mounted on one substrate 211, however, according to another exemplary embodiment, the light emitting devices 220 may be mounted on multiple substrates 211.

The light emitting devices 220 are mounted on the substrate 211. According to an exemplary embodiment, the light emitting devices 220 may be provided as a flip-chip type device. However, the inventive concepts are not limited thereto. In some exemplary embodiments, the light emitting devices 220 may be provided in various types, such as a lateral type device, a vertical type device, or a flip-chip type device.

The light emitting device 220 according to an exemplary embodiment may be a side surface light emitting type device, in which a light emission amount or a light intensity in the upward direction is equal to or less than about 80% of the maximum intensity. More particularly, when a maximum intensity of the light emitting device 220 is assumed as 100% in a normalized light intensity distribution of the emitted light according to an orientation angle, the intensity of the light emitting device 220 in the upward direction (e.g., the direction corresponding to about zero (0) degree of the orientation angle) may be equal to or less than about 80% of the maximum intensity. According to an exemplary embodiment, the intensity of light emitted from the light emitting device 220 in the upward direction may have a value less than about 80%, for example, or less than about 50% of the maximum intensity.

The intensity of light of the light emitting device 220 in the upward direction described above may be achieved by forming a light blocking pattern in the light emitting device 220. Since the light emitting device 220 is configured to emit light to travel in a lateral direction as far as possible rather than in the upward direction, a bright spot phenomenon in the upward direction may be reduced as compared with when light travels straight in the upward direction. As such, a thickness of a component, e.g., a light guide plate or a diffusion plate, which is used to diffuse light traveling in the upward direction, may be significantly reduced. The intensity of light emitted from the above-mentioned light emitting devices 220 and traveling in the upward direction may be controlled by forming the light blocking pattern in the light emitting devices 220. The light blocking pattern in the light emitting devices 220 will be described in more detail later.

A reflective layer 213 may be provided on the substrate 211. The reflective layer 213 reflects light that may be leaked without being provided in a direction to the display panel 100, to change the path of light towards the display panel 100. The reflective layer 213 includes a material that reflects light. Due to the reflective layer 213 reflecting light from the light emitting device 220, the amount of light provided to the display panel 100 may be increased.

The light guide member 230 diffuses and guides the emitted light forward and covers the light source unit 210, such that the light emitting devices 220 of the light source unit 210 are buried in or surrounded by the light guide member 230.

In particular, the light guide member 230 is provided on the light source unit 210 to fill a space between the light emitting devices 220 with a predetermined thickness TH. Accordingly, the light guide member 230 makes direct contact with an upper surface of the substrate 211 and side and upper surfaces of the light emitting devices 220.

According to an exemplary embodiment, since the light guide member 230 is provided on the light source unit 210 in the form of burying the light emitting devices 220 therein and, substantially simultaneously, the light guide member 230 is attached to the substrate 211 and the light emitting devices 220 to make direct contact with the substrate 211 and the light emitting devices 220, the light emitting devices 220 can be stably fixed to the substrate 211. The light emitting devices 220 may be attached to the substrate 211 by a solder 217 (refer to FIG. 5A). In this case, the light emitting devices 220 may be separated from the substrate 211 when an external force is applied to the light emitting devices 220 or the substrate 211. However, according to an exemplary embodiment, since the light guide member 230 supports and couples the light emitting devices 220 to the substrate 211, the light emitting devices 220 may be prevented from being separated from the substrate 211 even when external force is applied to the substrate 211 or the light emitting devices 220. As such, even when the light emitting devices 220 are mounted with a small area of the solder 217 and/or a small adhesive force, the light emitting devices 220 may not be separated from the substrate 211 by the light guide member 230 even when a solder strength between the light emitting devices 220 and the substrate 211 is within a range from about 10 to about 100 gf, as well as when the solder strength is equal to or greater than about 100 gf.

The light guide member 230 guides light emitted from the light emitting device 220 to the display panel 100. The light guide member 230 has a surface roughness 235 on the upper surface thereof to further disperse light traveling towards the display panel 100.

According to an exemplary embodiment, the surface roughness 235 has a depth within a range from about 1 micrometers (μm) to about 10 micrometers (μm), for example, a range from about 1 micrometers (μm) to about 4 micrometers (μm), or about 2 micrometers (μm).

According to an exemplary embodiment, the light guide member 230 may guide and diffuse light. For example, the light guide member 230 may include various polymer resins, such as silicone resin.

According to an exemplary embodiment, the light guide member 230 may include light scattering particles having various shapes dispersed therein to increase diffusion and reflection of light. For example, the light guide member 230 may include alumina, titanium oxide particles, beads, or the like therein.

In the backlight unit 200 according to an exemplary embodiment, since the light source unit 210 is surrounded by or buried in the light guide member 230, the thickness of the backlight unit 200 is significantly reduced. In addition, as the upper surface of the light guide member 230 has the surface roughness 235, light emitted from the light source unit 210 may be efficiently scattered, dispersed, and diffused to the front of the light guide member 230 by the light guide member 230. As such, the light diffusion efficiency may be increased as compared to a conventional light guide member, and thus, the light guide member 230 according to an exemplary embodiment may have a thickness that is significantly less than that of the conventional light guide member. According to an exemplary embodiment, the thickness TH of the light guide member 230 may be equal to or less than about 1000 micrometers (μm). According to another exemplary embodiment, the thickness TH of the light guide member 230 may be equal to or less than about 500 micrometers (μm), about 400 micrometers (μm), or about 300 micrometers (μm). The thickness of the light guide member 230 may be substantially the same as a distance from the upper surface of the substrate 211 of the light source unit 210 to the upper surface of the light guide member 230.

The surface roughness 235 may be formed by grinding, sandblasting, wet and/or dry etching the surface of the light guide member 230, and the light diffusion may be controlled in various ways, such as by controlling the degree and the depth of the surface roughness 235. The roughness may be uniformly provided on an entire upper surface of the light guide member 230, as well as the upper surface of the light emitting device 220 for the light diffusion effect. However, positions in which the surface roughness 235 is formed and the uniformity thereof are not particularly limited, and the positions and the uniformity of the surface roughness 235 may be changed in various ways by taking into account the light efficiency, the light intensity, and the arrangement of the light emitting device 220. For example, in some exemplary embodiments, the surface roughness 235 may be formed only in a portion of the light guide member 230, or may be formed to have different degrees of roughness depending on portions of the light guide member 230. For example, according to the intensity of light emitted from the light emitting devices 220, the roughness may be formed to have a different degree in an area between the light emitting devices 220, and in an area right above the light emitting device 220 as compared to other areas.

In an exemplary embodiment, the body of the light guide member 230 may be transparent and include the surface roughness 235 on the upper surface thereof. However, the inventive concepts are not limited thereto. In some exemplary embodiments, the body of the light guide member 230 itself may have a structure for diffusing light. For example, the light guide member 230 may include the light scattering particles, such that light emitted from the light source unit 210 may more easily be scattered and diffused in the light guide member 230. The light scattering particles may include an inorganic material, such as $TiO_2$, $CaCO_3$, $BaSO_4$, $Al_2O_3$, or silicon particles. The light scattering particles may be provided in the light guide member 230 in the form of beads.

In the backlight unit having the above-described structure according to an exemplary embodiment, the uniformity of light may be increased due to large light dispersion effect from the light guide member 230. As such, other optical structures and optical sheets may be obviated from the backlight unit. Accordingly, the backlight unit may have a significantly thinner thickness than a conventional backlight unit. As described above, since the light guide member 230 may have a very thin thickness, e.g., a thickness equal to or less than about 300 micrometers (μm), the overall thickness of the backlight unit may also be significantly reduced than a conventional backlight unit, even when the thickness of other optical members is added to the light guide member 230. The thickness of other optical members may be changed in various ways depending on its type. For example, each optical member may have a thickness from about 50 micrometers (μm) to about 400 micrometers (μm), and thus, the overall thickness of the backlight unit may be equal to or less than about 2 mm, about 1.7 mm, or about 1.5 mm, in consideration of the thickness of the optical members in addition to the thickness of the lower cover and the substrate.

On the other hand, light emitting devices in a conventional backlight unit include a lens having a lateral light orientation angle to reduce the intensity of light in the upward direction. In this case, because the size of the light emitting device itself is large, even when the light guide member formed of silicone resin is disposed on the light emitting device, a very thick thickness may be required for sufficient diffusion of light. In particular, since the light diffusion is not sufficient on the upper surface of the conventional light guide member, a separate light diffusion sheet was provided on the light guide member or a light diffusion pattern was printed on the light guide member to diffuse light, which further increases the thickness.

According to an exemplary embodiment, the intensity of light emitted from the light emitting device 220 in the upward direction is decreased, and substantially simultaneously, the light diffusion effect is maximized using the surface roughness 235 of the light guide member 230. In this manner, the backlight unit 200 according to an exemplary embodiment may be formed slim.

As described above, the light emitting device 220 of the light source unit 210 according to an exemplary embodiment has the structure in which the light emission in the lateral direction is maximized, while the light emitting device 220 of the light source unit 210 is stably fixed to the substrate 211.

Figure 5A:
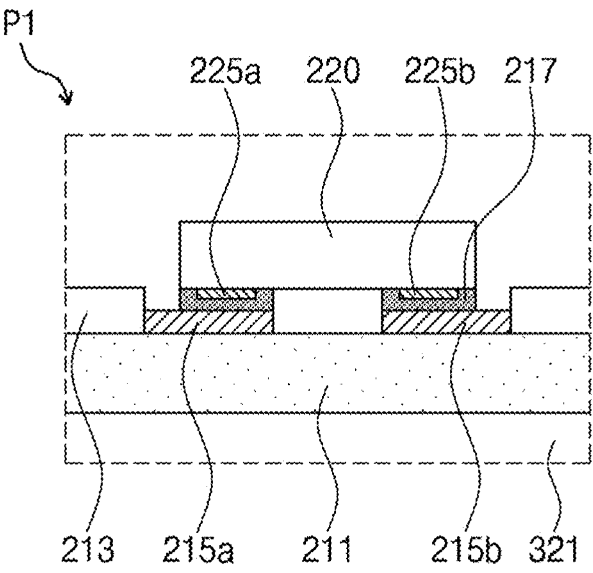
FIGS. 5A and 5B are a cross-sectional view and a plan view of a light emitting device mounted on a substrate according to an exemplary embodiment.
Figure 5B:
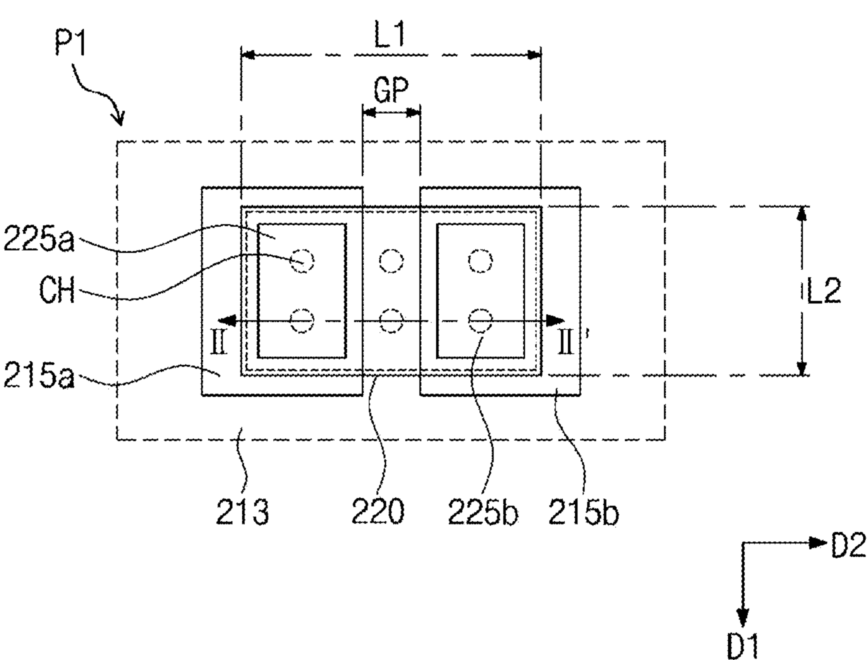

FIGS. 5A and 5B area a cross-sectional view and a plan view of the light emitting device mounted on the substrate according to an exemplary embodiment, respectively.

Referring to FIGS. 3, 4, 5A, and 5B, the light emitting device 220 according to an exemplary embodiment may be a flip-chip type light emitting device and may have substantially a rectangular parallelepiped shape. In particular, the light emitting device 220 may have substantially a square shape in a plan view, however, the inventive concepts are not limited thereto. In some exemplary embodiments, the light emitting device 220 may have substantially a rectangular shape with long sides and short sides. Hereinafter, a length of the long sides will be referred to as a "first length L1", and a length of the short sides will be referred to as a "second length L2".

The light emitting device 220 includes a first contact electrode 225*a* and a second contact electrode 225*b* to be electrically connected to external components. The first contact electrode 225*a* may be one of positive and negative electrodes of the light emitting device 220, and the second contact electrode 225*b* may be the other one of the positive and negative electrodes of the light emitting device 220.

First and second pad electrodes 215*a* and 215*b* are provided on the substrate 211 to be respectively connected to the first and second contact electrodes 225*a* and 225*b* via the solder 217. The first and second pad electrodes 215*a* and 215*b* apply signals from the circuit unit to the first and second contact electrodes 225*a* and 225*b* to drive the light emitting device 220.

Each of the first and second pad electrodes 215*a* and 215*b* may have a larger area than that of a corresponding contact electrode of the first and second contact electrodes 225*a* and 225*b* to facilitate connection via the solder 217. In the illustrated exemplary embodiment, a gap GP between two pads may be greater than a predetermined gap, for example, about 50 micrometers (μm) or more, such that the two electrodes, e.g., the first and second pad electrodes 215*a* and 215*b*, are isolated from each other. When the first and second pad electrodes 215*a* and 215*b* are spaced apart from each other at a predetermined interval, the possibility of short-circuit of the first and second pad electrodes 215*a* and 215*b* with the first and second contact electrodes 225*a* and 225*b* may be reduced when connecting the first and second pad electrodes 215*a* and 215*b* with the first and second contact electrodes 225*a* and 225*b* through the solder 217, thereby facilitating the mounting process.

A length in a first direction in which the first and second contact electrodes 225*a* and 225*b* are arranged in the light emitting device 220, and a length in a second direction substantially perpendicular to the first direction may be different from each other to stably connect the first and second pad electrodes 215*a* and 215*b* to the first and second contact electrodes 225*a* and 225*b*. For example, the first length L1 and the second length L2 of the light emitting device 220 may be different each other, and the first length L1 may be greater than the second length L2 as shown in figures. In this case, the first length L1 corresponds to the direction in which the first and second contact electrodes 225*a* and 225*b* are sequentially arranged. The light emitting device 220 may be formed to have various sizes. In an exemplary embodiment, the first length L1 may be within a range from about 260 micrometers (μm) to about 340 micrometers (μm), for example, about 300 micrometers (μm). The second length L2 may be within a range from about 190 micrometers (μm) to about 270 micrometers (μm), for example, about 230 micrometers (μm). In addition, the light emitting device 220 may have a height from about 60 micrometers (μm) to about 100 micrometers (μm), for example, about 80 micrometers (μm).

Figure 6:
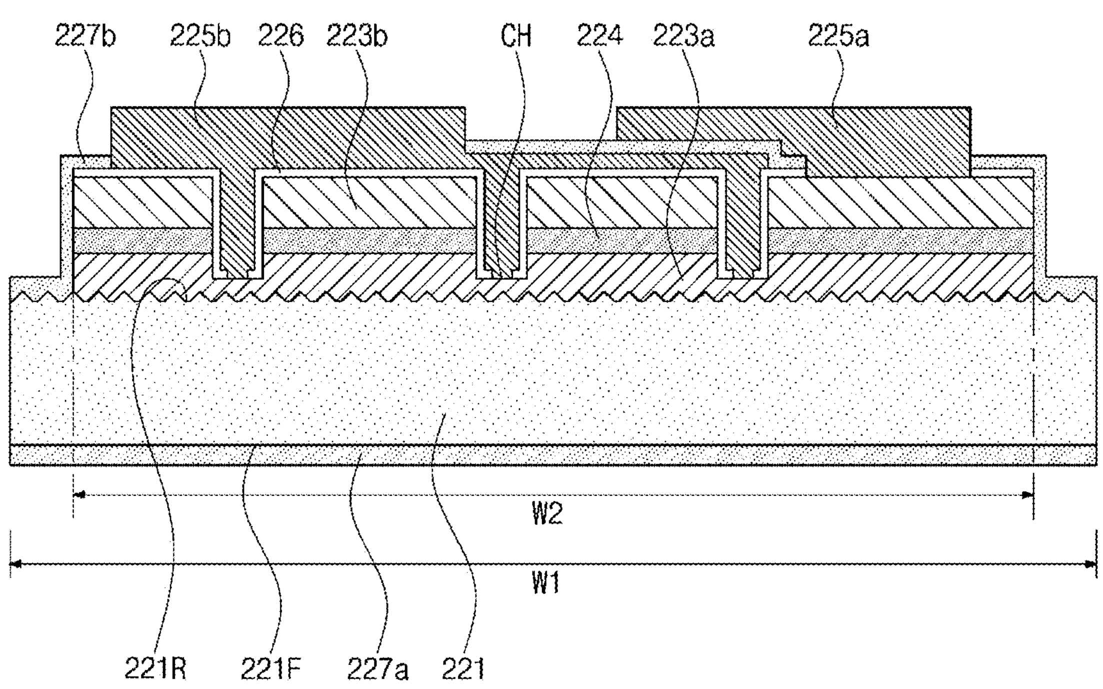
FIG. 6 is a cross-sectional view of a flip-chip type semiconductor chip of a light emitting device according to an exemplary embodiment.

FIG. 6 is a cross-sectional view taken along line II-II' of FIG. 5B illustrating a flip-chip type semiconductor chip according to an exemplary embodiment. Since the flip-chip type semiconductor may be formed on a substrate and then inverted to be mounted on another component, the flip-chip type semiconductor is shown in an inverted form in the figure.

Referring to FIG. 6, the light emitting device 220 according to an exemplary embodiment includes a device substrate 221 having a first surface 221F and a second surface 221R, a light emitting stacked structure disposed on the second surface 221R of the device substrate 221, and the first and second contact electrodes 225*a* and 225*b* connected to the light emitting stacked structure.

The device substrate 221 is not particularly limited as long as the light emitting stacked structure may be formed on the device substrate 221. The device substrate 221 may be a growth substrate, such as a sapphire substrate. However, the device substrate 221 may be formed of other materials, such as SiC, Si, GaAs, GaN, ZnO, GaP, InP, Ge, or $Ga_2O_3$ in other exemplary embodiments. In an exemplary embodiment, the device substrate 221 is patterned, and a plurality of protruding patterns is formed on an upper surface of the device substrate 221. In this case, the device substrate 221 may be a patterned sapphire substrate (PSS) as shown in the drawings.

The light emitting stacked structure includes a first semiconductor layer 223*a*, an active layer 224, and a second semiconductor layer 223*b* sequentially stacked on the second surface 221R of the device substrate 221. In the illustrated exemplary embodiment, the light emitting stacked structure may have at least one mesa structure including the active layer 224 and the second semiconductor layer 223*b*. In this case, the light emitting stacked structure may include a plurality of protruding patterns, and the protruding patterns may be spaced apart from each other.

An insulating layer 226 is disposed on the light emitting stacked structure. At least one contact hole CH is defined through the active layer 224, the second semiconductor layer 223*b*, and the insulating layer 226 to expose a portion of the first semiconductor layer 223*a*. The first contact electrode 225*a* is connected to the first semiconductor layer 223*a* exposed through the contact hole CH. The second contact electrode 225*b* is connected to the second semiconductor layer 223*b* exposed through an opening defined above the second semiconductor layer 223*b*.

In the light emitting device 220, since the first and second contact electrodes 225*a* and 225*b* have substantially the same small size, mounting the first and second contact electrodes 225*a* and 225*b* on lines of the device substrate 221 may be facilitated. Accordingly, the light emitting device 220 may be provided at a very small micro scale.

A first light blocking pattern 227*a* is disposed on the first surface 221F of the device substrate 221. The first light blocking pattern 227*a* prevents light from exiting through the first surface 221F of the device substrate 221. Since the flip-chip is mounted on the substrate 211 after being inverted, the first surface 221F faces upward toward the display panel 100 (refer to FIG. 2), and light traveling in the upper direction is blocked by the first light blocking pattern 227*a*. In an exemplary embodiment, light emitted from the light emitting stacked structure travels to a lateral direction of the device substrate 221 due to the first light blocking pattern 227*a*.

The first light blocking pattern 227*a* is a light blocking layer to prevent light generated from the light emitting stacked structure from being emitted directly through a lateral portion of the light emitting stacked structure, rather than being emitted through the device substrate 221. The first light blocking pattern 227*a* includes a material that absorbs, reflects, and scatters a specific light. The material of the first light blocking pattern 227*a* is not particularly limited as long as the first light blocking pattern 227*a* absorbs, reflects, or scatters light to block the transmission. In an exemplary embodiment, a non-light transmitting layer may be a distributed Bragg reflector (DBR) dielectric mirror, a metal reflection layer formed on the insulating layer 226, or a black-colored organic polymer layer.

In an exemplary embodiment, a second light blocking pattern 227*b* may be disposed on the insulating layer 226 and on a side surface of the light emitting stacked structure. As the second light blocking pattern 227*b* is disposed on the side surface of the light emitting stacked structure, light emitted from one light emitting stacked structure may be prevented from exerting an influence to an adjacent light emitting stacked structure, or from mixing with light emitted from the adjacent light emitting stacked structure. When the metal reflection layer is used as the non-light transmitting layer, the metal reflection layer may be in a floating state such that the metal reflection layer is electrically insulated from components of other light emitting stacked structures.

The first and/or the second light blocking patterns 227*a* and 227*b* may be a band pass filter that reflects light of a specific wavelength while transmitting light of other wavelengths. In particular, when the light emitting stacked structure emits light having a specific wavelength, the first and/or second light blocking patterns 227*b* may reflect light emitted from the light emitting stacked structure but may transmit other light. For example, when the light emitting stacked structure emits blue light, the first light blocking pattern 227*a* may be a dielectric mirror that blocks blue light and yellow light, and the second light blocking pattern 227*b* may be a dielectric mirror that blocks blue light.

In an exemplary embodiment, the active layer 224 may have an area smaller than an area of the device substrate 221 when viewed in plan. Accordingly, as shown in FIG. 6, a width W2 of the active layer 224 may be less than a width W1 of the device substrate 221. FIG. 6 only shows widths in a first length direction, however, according to an exemplary embodiment, a width of the active layer 224 in a second length direction may also be less than a width of the device substrate 221 in the second length direction. Since the area of the active layer 224 is smaller than the area of the device substrate 221, and the second light blocking pattern 227*b* is formed on the lateral portion of the active layer 224, light generated by the active layer 224 travels to the device substrate 221 as much as possible. In this manner, light generated by the active layer 224 is primarily scattered by the protruding patterns formed on the upper surface of the device substrate 221, and then emitted through the lateral portion of the device substrate 221 after being scattered and reflected several times in the device substrate 221.

Figure 7A:
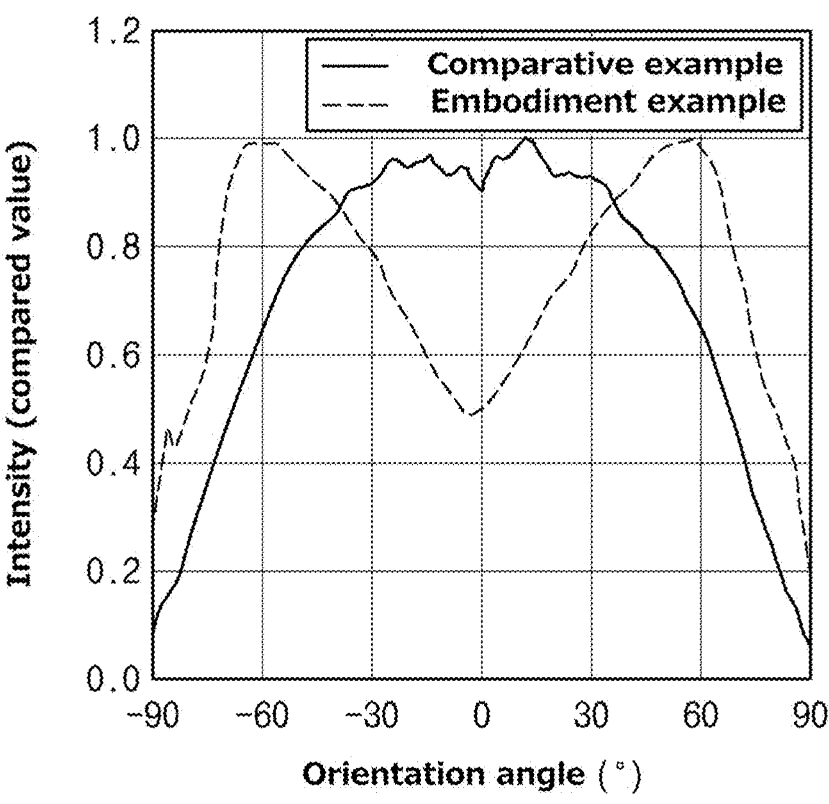
FIGS. 7A and 7B are graphs showing a light profile of a conventional light emitting device and a light profile of a light emitting device according to an exemplary embodiment.
Figure 7B:
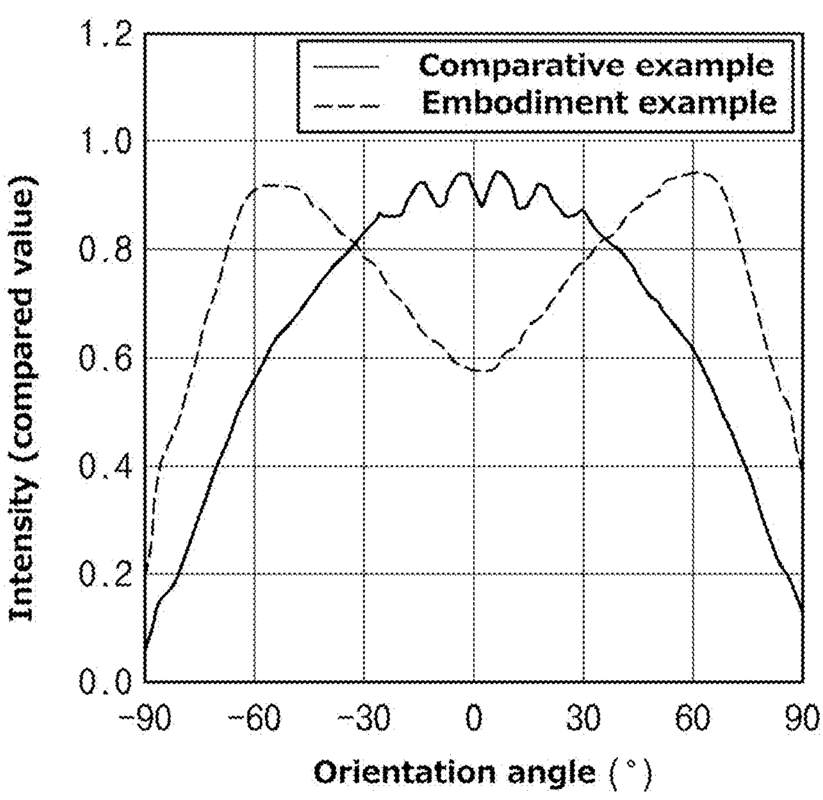

FIGS. 7A and 7B are graphs showing a light profile of a conventional light emitting device and a light profile of the light emitting device according to an exemplary embodiment. FIG. 7A is a light profile showing an intensity of light emitted from the light emitting device as a function of an angle with respect to the first length direction, and FIG. 7B is a light profile showing an intensity of light emitted from the light emitting device as a function of an angle with respect to the second length direction. In FIGS. 7A and 7B, an angle of about zero (0) degrees corresponds to a direction substantially perpendicular to the surface of the substrate 211 when the light emitting device of FIG. 6 is mounted on the substrate 211 after being inverted. The light profiles shown in FIGS. 7A and 7B are normalized by setting the intensity of light at an angle where the intensity of the emitted light is greatest to 1. In FIGS. 7A and 7B, a solid line indicates the light profile of the conventional light emitting device, and a dotted line indicates the light profile of the light emitting device according to an exemplary embodiment. The light emitting device according to an exemplary embodiment is manufactured under the same structure and conditions as the conventional light emitting device except that the first light blocking pattern is formed on the first surface of the device substrate 221.

Referring to FIGS. 7A and 7B, in the light source unit according to an exemplary embodiment, although there is a difference in the light profile depending on the direction, the intensity of light emitted toward the upward direction of the substrate is significantly reduced compared with the conventional light emitting device regardless of the direction, and has a value equal to or less than about 80% of the maximum intensity of light.

In FIG. 7A, light emitted from the conventional light emitting device and traveling in the upward direction has an orientation angle equal to or less than about 140 degrees, and has a value equal to or greater than about 90% of the maximum intensity of light. In particular, as light shown in an area between about −30 degrees and about +30 degrees has the intensity of about 90% or more, it can be confirmed that the amount of light traveling in the upward direction is very large in the conventional light emitting device. In FIG. 7B, light emitted from the conventional light emitting device and traveling in the upward direction of the substrate has a value equal to or greater than about 90% of the maximum intensity of light, and has the intensity of light of about 90% or more in the area between about −30 degrees and about +30 degrees as in FIG. 7A. In addition, although the conventional light emitting device has a rectangular shape, the light profiles in the first and second length directions are very similar to each other, and the orientation angles have similar values. In particular, the orientation angles in the first and second length directions are about 136.0 degrees and about 136.3 degrees, respectively, which are very similar to each other.

On the other hand, in FIG. 7A, light emitted from the light emitting device according to an exemplary embodiment and traveling in the upward direction of the substrate has an orientation angle equal to or less than about 170 degrees. In addition, light emitted from the light emitting device according to an exemplary embodiment and traveling in the upward direction of the substrate has a value equal to or less than about 50% in the area between about −30 degrees and about +30 degrees, and the value decreases as the orientation angle gets close to zero (0) degrees. As such, the intensity of light traveling in the upward direction of the substrate is equal to or less than about 50% of the maximum intensity of light. In FIG. 7B, the intensity of light emitted from the light emitting device according to an exemplary embodiment and traveling in the upward direction of the substrate is equal to or less than about 85% of the maximum intensity in the area between about −30 degrees and about +30 degrees, and the intensity decreases as the orientation angle gets close to zero (0) degrees. As such, the intensity of light traveling in the upward direction of the substrate is equal to or less than about 65% of the maximum intensity of light. In addition, according to an exemplary embodiment, the light profiles of the first length direction and the second length direction are different from each other due to the light blocking layer. In particular, the orientation angles of the light emitting device in the first and second length directions are about 160.0 degrees and about 169.4 degrees, respectively. As such, there is a difference of about 10 degrees between the orientation angles depending on the directions.

As described above, in the light source unit including the light emitting device according an exemplary embodiment, it is possible to reduce light in the upward direction and increase light in the lateral direction without a separate structure (e.g. a light orientation lens) to increase an emission of light in the lateral direction as compared to a conventional light source unit. As such, the bright spot phenomenon right above the light emitting device may be suppressed.

Further, light emitted from the light emitting device in the lateral direction is relatively oblique to the upper surface of the light guide member, so that the probability of scattering, reflection, and diffusion on the upper surface of the light guide member may be increased. Light emitted from the light emitting device in the lateral direction is further scattered, reflected, and diffused by the light guide member having the surface roughness formed on the upper surface thereof, which may also increase the uniformity of light, thereby reducing defects due to the bright spot or a dark spot.

As described above, the amount of light in the lateral portion may be increased without using a separate structure, such as a lens, and the uniformity of the light may further be increased by the light guide member. Accordingly, the thickness of the backlight unit may be minimized, and light having improved quality may be provided to the display panel.

As described above with reference to FIGS. 7A and 7B, the light emitting device may have different light profiles in the first length direction and the second length direction crossing the first length direction. This is because the light emitting device has different lengths depending on the directions, and thus, there is a difference in the light emission area depending on the directions.

When the light emitting devices have the different light profiles depending on the directions, the light emitting devices may be arranged at various pitches on the substrate by taking into account the light profiles in the backlight unit.

Figure 8:
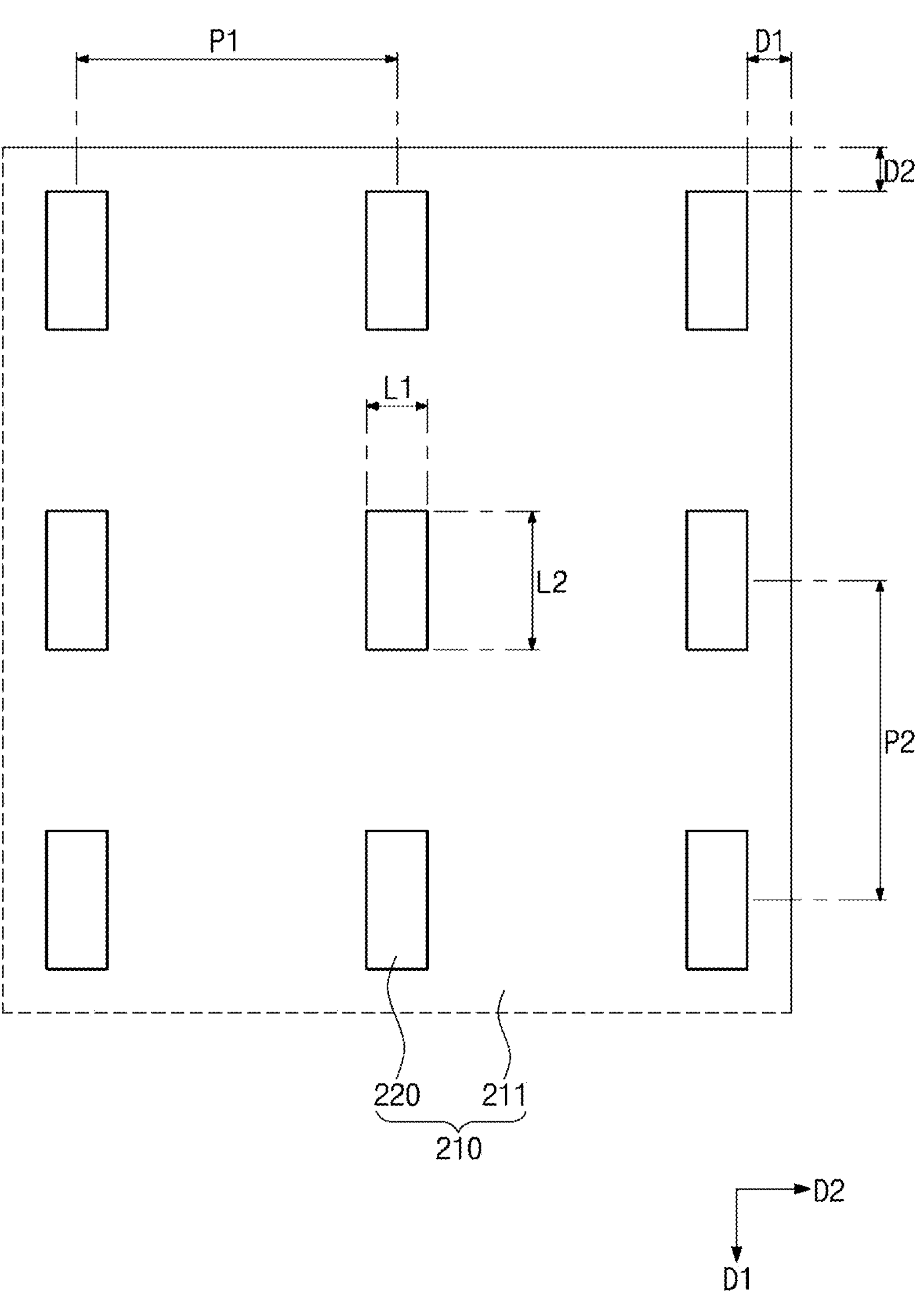
FIG. 8 is a plan view of light emitting devices arranged on a substrate in a backlight unit according to an exemplary embodiment.

FIG. 8 is a plan view of the light emitting devices 220 arranged on the substrate 211 in the backlight unit according to an exemplary embodiment. FIG. 8 exemplarily shows only the substrate 211 and the light emitting devices 220 in some areas, i.e., upper right end corner of the light source unit 210 in a plan view.

Referring to FIG. 8, the light emitting devices 220 may be arranged in a matrix form along rows and columns on the substrate 211 of the backlight unit. The light emitting devices 220 are spaced apart from each other at a predetermined pitch along a row direction and a column direction. When assuming that a pitch in the first direction D1 is a first pitch P1 and a pitch in the second direction D2 is a second pitch P2, the first pitch P1 may be different from the second pitch P2. In the illustrated exemplary embodiment, when the light emitting device 220 are arranged, the light emitting devices 220 may be arranged to have a larger pitch along a direction in which light intensity is relatively greater among the first direction D1 and the second direction D2. For example, when the length direction (e.g., the first length L1) of the light emitting device 220 coincides with the first direction D1, the intensity of light in the first direction D1 is greater than the intensity of light in the second direction D2. In this case, the first pitch P1 according to the first direction D1 may be greater than the second pitch P2 in consideration that the intensity of light in the second direction D2 is greater than the intensity of light in the first direction D1.

According to an exemplary embodiment, the light emitting devices 220 are stably fixed to the substrate 211 by the light guide member 230. However, the outermost light emitting devices 220 disposed near the corners and the vertices of the substrate 211 have a greater risk of separation from the substrate 211 compared with the light emitting devices 220 disposed relatively at the inner side. Accordingly, the light emitting devices 220 disposed near the corners and the vertices of the substrate 211 are required to be sufficiently spaced apart from the corners to secure sufficient support by the light guide member 230. For example, the outermost light emitting device 220 disposed near the corners and the vertices of the substrate 211 may need to be spaced apart from sides respectively extending in the first direction D1 and the second direction D2 by first and second distances R1 and R2. The first and second distances R1 and R2 may be equal to or greater than about 1 mm. When the outermost light emitting device 220 is spaced apart from the sides by about 1 mm or more, the light guide member 230 can be provided in the portion between the sides and the outermost light emitting device 220 to sufficiently support the light emitting devices 220. In this manner, the separation of the light emitting devices 220 from the substrate 211 may be efficiently prevented.

However, the arrangement of the light emitting devices 220 are not limited thereto, and the arrangement may be changed in various ways as long as the uniform light may be provided to the display panel. For example, even when the light emitting devices 220 having the different light profiles depending on the first and second directions D1 and D2 are arranged, the first pitch P1 and the second pitch P2 need not be set differently when the light scattering effect is large due to the light scattering and dispersion effects from the light guide member 230. In this case, the first pitch P1 and the second pitch P2 may be the same as each other. In addition, when the light scattering effect is large due to the light scattering and dispersion effects of the light guide member 230, a regularity in the arrangement of the light emitting devices 220 may be lower, and in some cases, the light emitting devices 220 may be randomly arranged without being regularly arranged.

As described above, the backlight unit according to an exemplary embodiment provides light having the improved uniformity by employing the light emitting device, in which the amount of light in the lateral portion significantly increases, and the light guide member having high scattering, diffusion, and dispersion effects of light. As such, the thickness of the backlight unit may be significantly reduced, and the backlight unit may provide light having improved quality to the display panel.

According to an exemplary embodiment, since the slim backlight unit may be implemented by using the light emitting device that emits substantial amount of light in the lateral direction, and the light guide member having high scattering, diffusion, and dispersion effects of light, the display device may be formed slim even when an additional optical member is adopted to increase the light efficiency.

Figure 9:
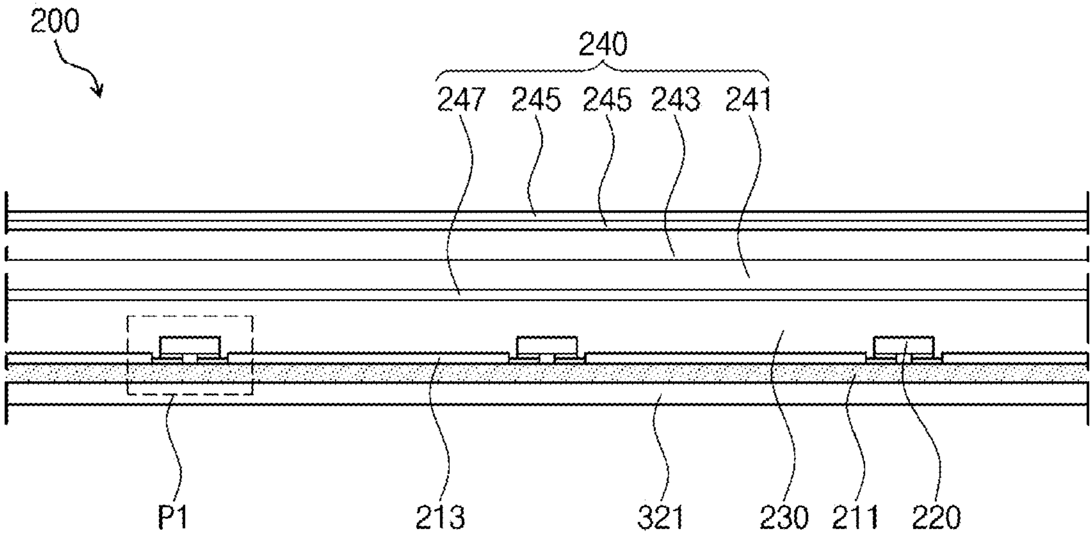
FIG. 9 is a cross-sectional view taken along line I-I' of FIG. 2 according to another exemplary embodiment.

FIG. 9 is a cross-sectional view taken along line I-I' of FIG. 2 illustrating the backlight unit according to an exemplary embodiment.

Referring to FIG. 9, the light source unit 210, the light guide member 230, and the optical member 240 are sequentially disposed on the lower cover 320.

The optical member 240 may be disposed between the light guide member 230 and the display panel 100. The optical member 240 may further include a brightness enhancement film 247 in addition to the diffusion sheet 245, the prism sheet, the protective sheet, and the light conversion sheet described above. The brightness enhancement film 247 may include various films known in the art, and the type and configuration of the brightness enhancement film 247 are not particularly limited. For example, the brightness enhancement film 247 may be a film, such as 3M's Vikuiti™. The brightness enhancement film 247 may have various thicknesses. In an exemplary embodiment, the brightness enhancement film 247 may have the thickness equal to or less than about 0.1 mm, for example, about 50 micrometers (μm).

The light source unit and the light guide member having the above-mentioned structure according to an exemplary embodiment may be manufactured by the following methods.

FIGS. 10A, 11A, 12A, 13A, and 14A are schematic views illustrating a method of forming the light source unit and the light guide member according to an exemplary embodiment, and FIGS. 10B, 11B, 12B, 13B, and 14B are cross-sectional views taken along lines III-III' of FIGS. 10A, 11A, 12A, 13A, and 14A, respectively.

Figure 10A:
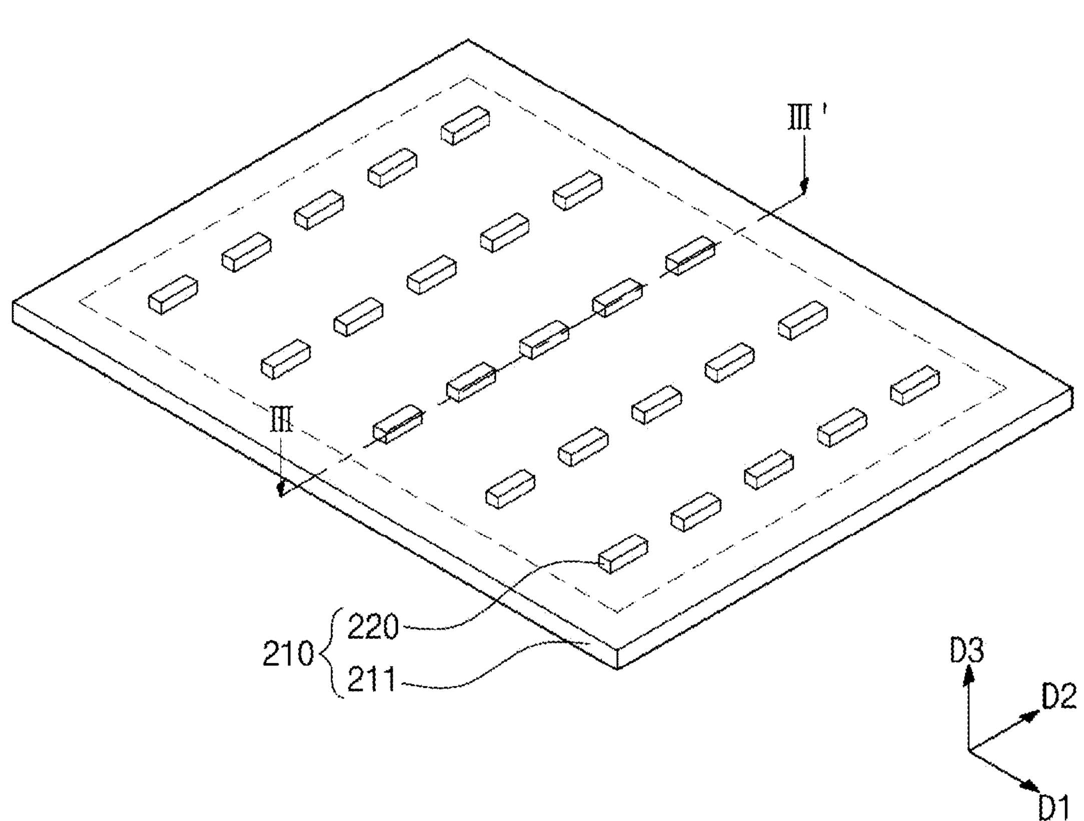
FIGS. 10A, 11A, 12A, 13A, and 14A are schematic views illustrating a method of forming the light source unit and the light guide member according to an exemplary embodiment.
Figure 10B:
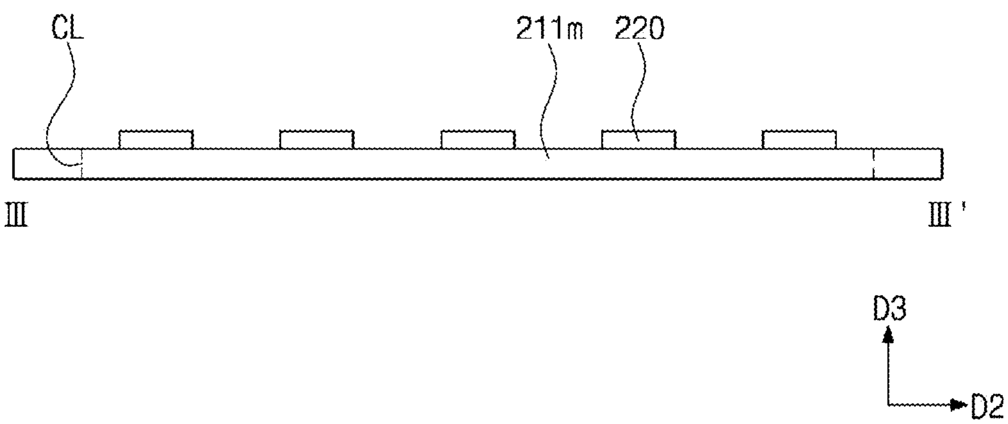
FIGS. 10B, 11B, 12B, 13B, and 14B are cross-sectional views taken along line III-III' of FIGS. 10A, 11A, 12A, 13A, and 14A, respectively.

Referring to FIGS. 10A and 10B, the light emitting devices 220 are mounted on a mother substrate 211*m*. The mother substrate 211*m* may have a size greater than a size of the light source unit to be obtained, and may have a very wide plate shape to form a plurality of light source units. An imaginary cutting line may be defined in the mother substrate 211*m* for cutting the mother substrate 211*m* into a substrate having a desired size afterwards. The light emitting devices 220 are arranged inside the cutting line.

Figure 11A:
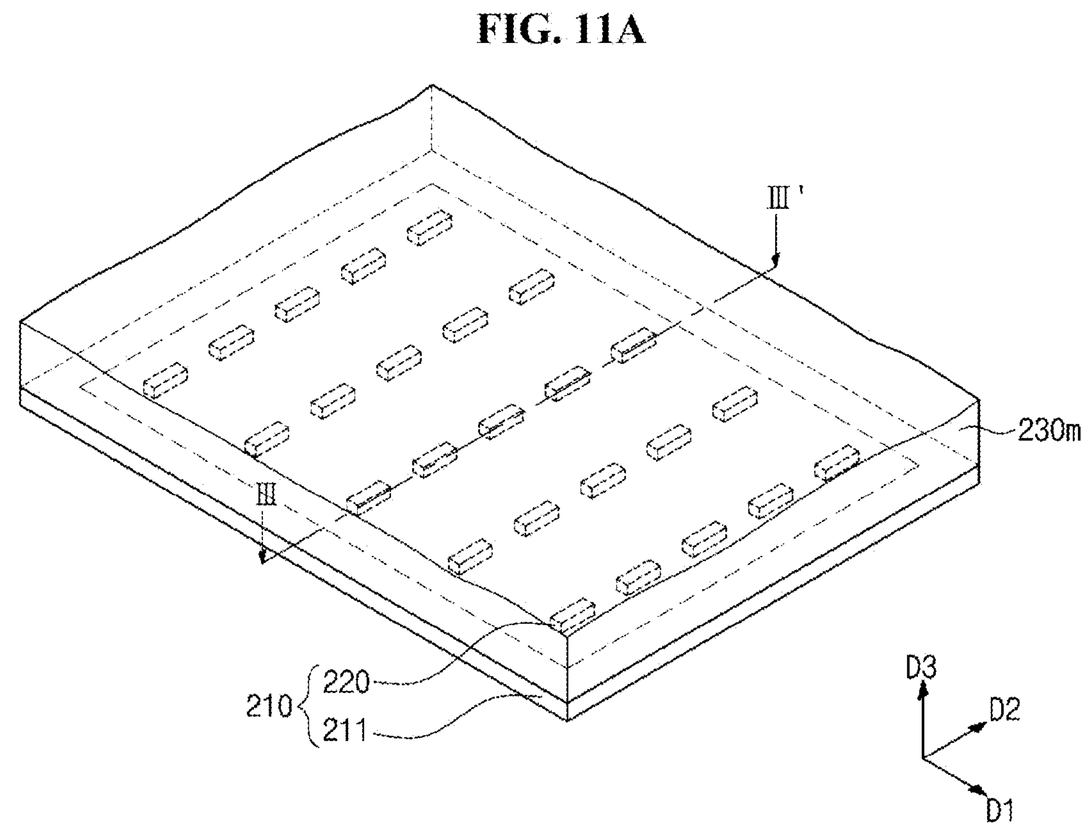
Figure 11B:
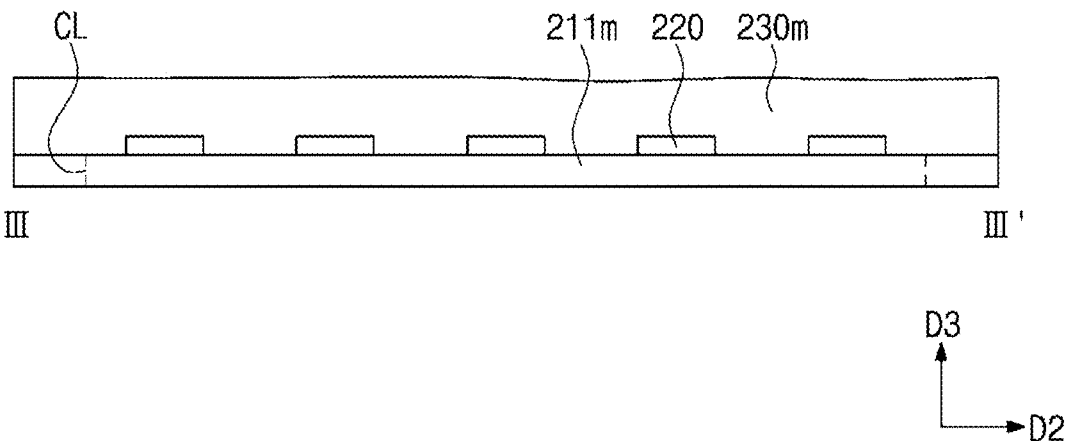

Referring to FIGS. 11A and 11B, the light emitting devices 220 are mounted on the substrate 211, and then a material for the light guide member, which is not cured, is coated on the substrate 211 on which the light emitting devices 220 are mounted. The material for the light guide member is provided on the upper portion of the light source unit 210 and in a space between the light emitting devices 220 by the coating process. The coated material for the light guide member is cured to form an initial light guide member 230*m*.

Figure 12A:
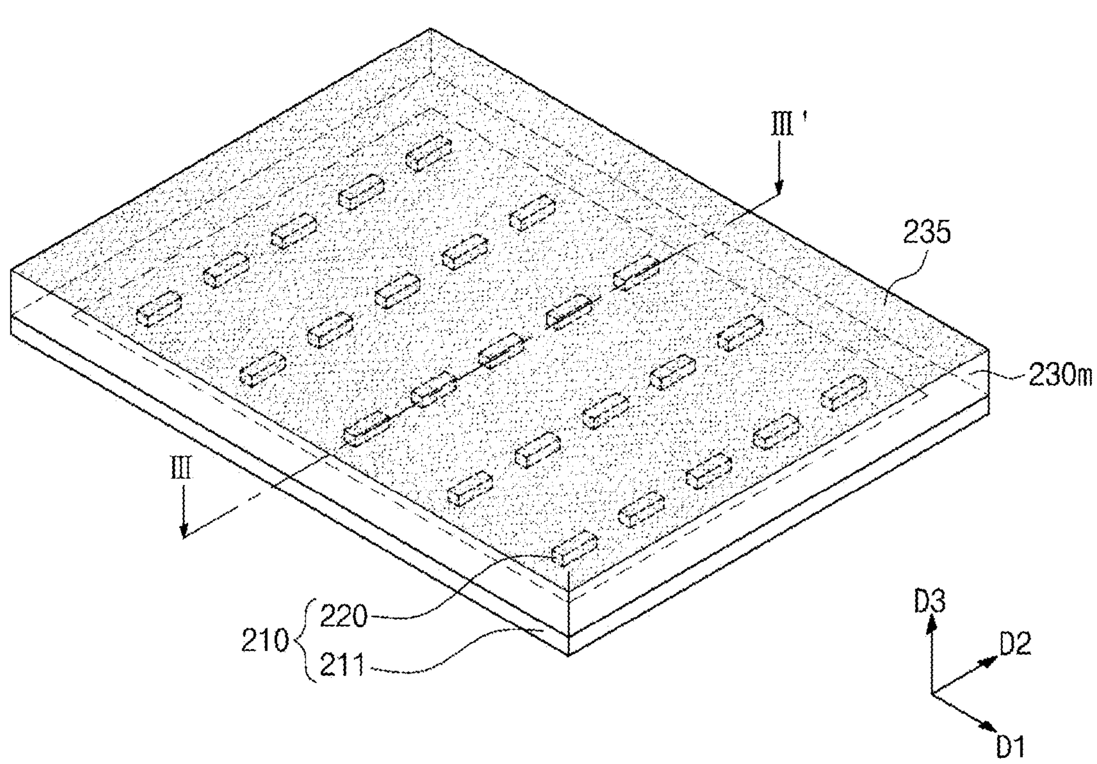
Figure 12B:
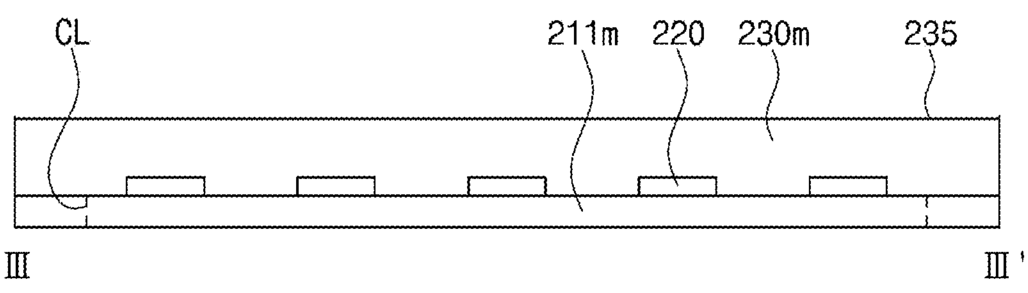

Referring to FIGS. 12A and 12B, the surface roughness 235 is formed on an upper surface of the cured initial light guide member 230*m* by various methods. The surface roughness 235 may be formed by grinding, sandblasting, and wet and/or dry etching (e.g., a plasma treatment) the upper surface of the light guide member 230, without being limited thereto.

When the surface roughness 235 is formed by the grinding method according to an exemplary embodiment, the surface roughness 235 may be obtained by grinding the light guide member 230 formed of the polymer resin using a ceramic grinder (diamond) of about 80 mesh size to about 100 mesh size (about 5 μm to about 200 μm in diameter) or a reinforced steel.

Figure 13A:
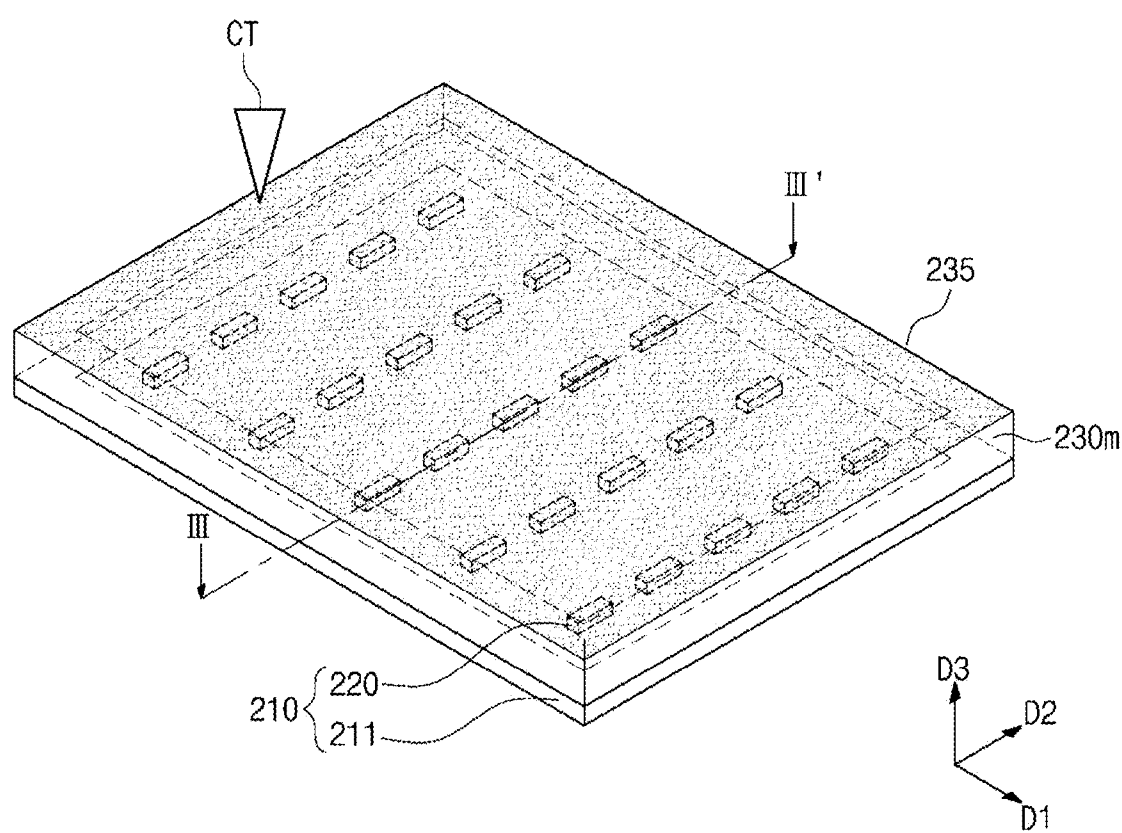
Figure 13B:
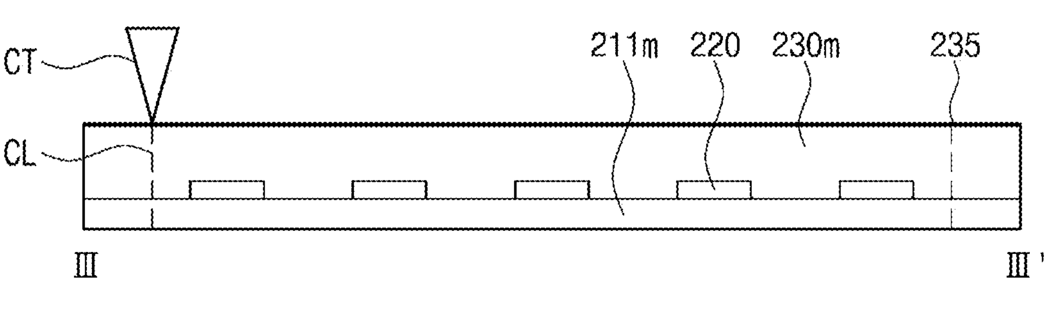

Referring to FIGS. 13A and 13B, the initial light guide member 230*m* on which the surface roughness 235 is formed and the light source unit 210 are cut to a desired size along the cutting line CL using a cutting member CT.

Figure 14A:
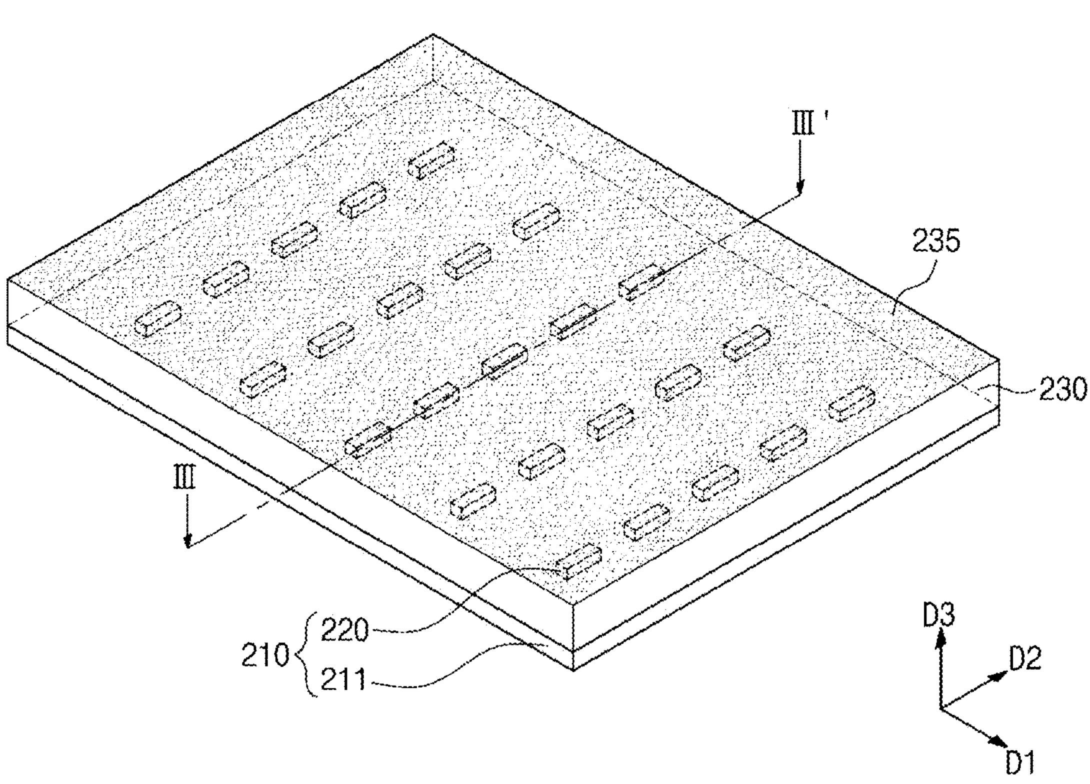
Figure 14B:
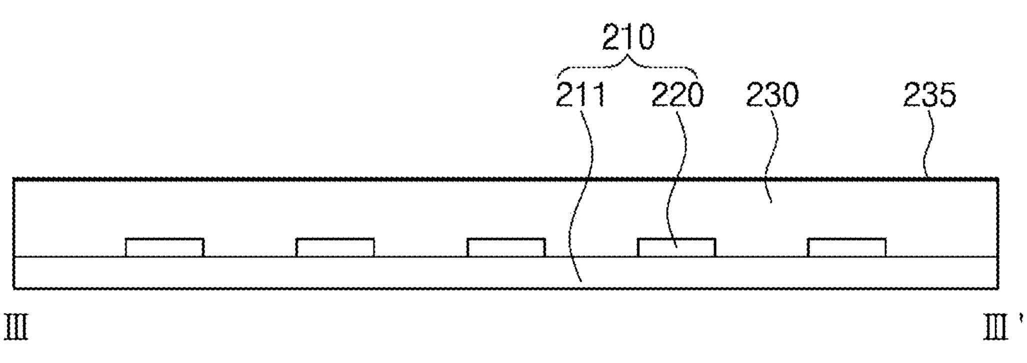

Referring to FIGS. 14A and 14B, the light guide member 230 and the light source unit 210 are then coupled to each other to provide an integrated structure.

However, the inventive concepts are not limited to a particular method for manufacturing the light source unit 210 and the light guide member 230.

According to exemplary embodiments, a backlight unit has a slim size and is capable of providing light with high uniformity.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A light emitting module comprising:

a cover;

a substrate disposed on the cover;

a light emitter disposed on the substrate and configured to emit light;

a reflector disposed on the substrate and configured to reflect light emitted from the light emitter; and a light guide disposed on the cover and configured to diffuse the light emitted from the light emitter, wherein the light emitter includes a first contact electrode and a second contact electrode, wherein the substrate includes a first pad electrode electrically connected to the first contact electrode and a second pad electrode electrically connected to the second contact electrode, wherein a first gap between the first pad electrode and the second pad electrode is different from a second gap between the first contact electrode and the second contact electrode, and wherein the first gap between the first pad electrode and the second pad electrode is greater than about 50 micrometers (μm).

2. The light emitting module of claim 1, wherein the light guide includes a region having a greater thickness than the first gap between the first pad electrode and the second pad electrode.

3. The light emitting module of claim 2, wherein the thickness of the region is substantially the same as a distance from an upper surface of the substrate to an upper surface of the light guide.

4. The light emitting module of claim 2, wherein the thickness of the region is equal to or less than 1000 micrometers (μm).

5. The light emitting module of claim 1, further including a circuit comprising a timing controller disposed on cover.

6. The light emitting module of claim 1, wherein the light emitter has a first length in a first direction in which the first and second contact electrodes are arranged and a second length in a second direction substantially perpendicular to the first direction.

7. The light emitting module of claim 6, wherein the first length of the light emitter is greater than the second length of the light emitter.

8. The light emitting module of claim 7, wherein the thickness of the region is greater than the first length of the light emitter.

9. A display apparatus, comprising:

a cover;

a substrate disposed on the cover;

a light emitter disposed on the substrate and configured to emit light;

a reflector disposed on the substrate and configured to reflect light emitted from the light emitter; and a light guide disposed on the cover and configured to diffuse the light from the light emitter, wherein the light emitter includes a first contact electrode and a second contact electrode, wherein the substrate includes a first pad electrode electrically connected to the first contact electrode and a second pad electrode electrically connected to the second contact electrode, wherein the light emitter has a first length in a first direction in which the first and second contact electrodes are arranged and a second length in a second direction substantially perpendicular to the first direction, wherein the first length of the light emitter is different from the second length of the light emitter, wherein a gap between the first pad electrode and the second pad electrode is different from the first length of the light emitter, and wherein the gap is greater than about 50 micrometers (μm).

10. The display apparatus of claim 9, wherein the gap between the first pad electrode and the second pad electrode is different from a gap between the first contact electrode and the second contact electrode.

11. The display apparatus of claim 9, further including a circuit comprising a timing controller disposed on the cover.

12. The display apparatus of claim 11, wherein the timing controller is formed of an integrated circuit.

13. The display apparatus of claim 12, wherein the light emitter includes a wavelength conversion material.

14. The display apparatus of claim 13, wherein the wavelength conversion material includes a red phosphor.

15. A display apparatus, comprising:

a cover;

a substrate disposed on the cover;

a light emitter disposed on the substrate and configured to emit light;

a reflector disposed on the substrate and configured to reflect light emitted from the light emitter; and an optical layer disposed on the substrate and configured to diffuse the light from the light emitter, wherein the light emitter includes a first contact electrode and a second contact electrode, wherein the substrate includes a first pad electrode electrically connected to the first contact electrode and a second pad electrode electrically connected to the second contact electrode, wherein the light emitter has a first length in a first direction in which the first and second contact electrodes are arranged and a second length in a second direction substantially perpendicular to the first direction, wherein the first length of the light emitter is different from the second length of the light emitter, wherein a gap between the first pad electrode and the second pad electrode is different from the first length of the light emitter, and wherein the gap is greater than about 50 micrometers (μm).

16. The display apparatus of claim 15, the gap between the first pad electrode and the second pad electrode is different from a gap between the first contact electrode and the second contact electrode.

17. The display apparatus of claim 16, wherein the light guide includes a region having a greater thickness that the first gap between the first pad electrode and the second pad electrode.

18. The display apparatus of claim 15, further including a circuit comprising a timing controller disposed on the cover.

19. The display apparatus of claim 18, wherein the timing controller is formed of an integrated circuit.

20. The display apparatus of claim 15, wherein the light emitter is attached to the substrate by a solder.

* * * * *